(12) United States Patent
Van Wingerden

(10) Patent No.: US 6,315,233 B1
(45) Date of Patent: Nov. 13, 2001

(54) TRANSPORTING DEVICE FOR A VOLUMINOUS CONTAINER AND SUCH A CONTAINER

(75) Inventor: Hubertus Franciscus Cornelius Maria Van Wingerden, Sprundel (NL)

(73) Assignee: Albers Alligator Projekten B.V., Wageningen (NL)

(*) Notice: Subject to any disclaimer, the term of this patent is extended or adjusted under 35 U.S.C. 154(b) by 0 days.

(21) Appl. No.: 09/180,093

(22) PCT Filed: Apr. 22, 1997

(86) PCT No.: PCT/NL97/00205
§ 371 Date: Nov. 2, 1998
§ 102(e) Date: Nov. 2, 1998

(87) PCT Pub. No.: WO97/42102
PCT Pub. Date: Nov. 13, 1997

(30) Foreign Application Priority Data

May 2, 1996 (NL) .................................................. 1002989

(51) Int. Cl.$^7$ .................................................. B65H 75/40
(52) U.S. Cl. .................. 242/403; 242/399.1; 242/533.8; 222/168; 280/838
(58) Field of Search ................................ 242/403, 533.8, 242/919, 918, 399.1, 399.2, 592; 222/99, 168, 608; 280/838; 180/242; 239/661, 672; 414/528

(56) References Cited

U.S. PATENT DOCUMENTS

| 2,958,478 | * | 11/1960 | Petersen et al. | 242/403 X |
|---|---|---|---|---|
| 3,132,820 | * | 5/1964 | Toll | 242/533.8 X |
| 3,627,224 | * | 12/1971 | Diggs | 242/403 X |
| 3,642,224 | * | 2/1972 | Taylor | 242/399.2 X |
| 3,756,509 | * | 9/1973 | Hamnes | 239/661 X |
| 4,161,263 | | 7/1979 | Wagner | 222/100 |
| 4,324,370 | * | 4/1982 | Guard et al. | 242/403 |
| 4,634,056 | | 1/1987 | Precure | 239/661 |
| 5,499,743 | | 3/1996 | Blumenkron | 222/107 |
| 6,014,778 | * | 1/2000 | Varnado | 242/919 X |

FOREIGN PATENT DOCUMENTS 27 56 455 6/1979 (DE) .
1231391 9/1960 (FR) .

* cited by examiner

Primary Examiner—William A. Rivera
(74) Attorney, Agent, or Firm—Joan H. Pauly

(57) ABSTRACT

The invention relates to a transporting device for transporting a voluminous, substantially empty container (1), which transporting device has a shape and dimensions suitable for use on the public highway and is provided with a mobile main frame (12); a sub-frame (11) supported by the main frame (12); a rolling-up member (10) rotatably mounted on a lying shaft in the sub-frame (11); drive means (15) for rotating the rolling-up member (10); coupling means (13) arranged on the rolling-up member (10) for coupling the rolling-up member (10) to the container (1), and turning means (17) for turning the sub-frame (11) on a standing shaft relative to the main frame (12). The invention also relates to a container (1) which is transported with interposing of a transporting device (11, 12) according to the invention.

16 Claims, 3 Drawing Sheets

TRANSPORTING DEVICE FOR A VOLUMINOUS CONTAINER AND SUCH A CONTAINER

TECHNICAL FIELD

The invention relates to a transporting device for transporting a voluminous container according to the preamble of claim 1.

BACKGROUND OF THE INVENTION

Such a transporting device is known from U.S. Pat. No. 4,161,263. These transporting devices consist essentially of a system or storing and handling collapsible rubberised containers used in the transporting of fluent materials within bulk material transporting trailers. This known container is used as lining in a shipping container. The maximum volume of this known container is limited, because restricted to the volume of the shipping container.

This known handling system does not provide a solution to the problem of the transport of the voluminous container, with a volume exceeding the volume of a shipping container.

Further it is described in FR-A-1,231,391 that the transport of a voluminous container for fluids is done empty and preceeded with complicated and labour-intensive folding operations, in particular containers having dimensions, in particular a width exceeding the dimension allowed on the public road, in general 2.60 meters.

BRIEF SUMMARY OF THE INVENTION

The invention dispenses with these problems and provides for this purpose a transporting device having the features of claim 1.

Such a transporting device enables the transport of a voluminous, substantially empty container in simple and rapid manner.

The permitted width dimension of a container for transporting which is rolled up on the rolling-up member of the sub-frame increases considerably by turning the sub-frame round the main frame.

Turning means, for example turning tables as such are known from U.S. Pat. No. 4,634,056 in a compost spreader. As for a lot of agricultural vehicles turning means are known to provide a larger width on the farmed land than on main road.

The invention likewise relates to a container which is transported with a transporting device according to the invention and consists substantially of a flexible material, which container is manufactured substantially from a material which can be rolled up and is adapted for the storage of material which can be pumped, wherein the container is provided with rolling-up means for coupling to the rolling-up device.

A container according to the invention is preferably provided with safety provisions for pressure, stabilization and/or level control.

A preferred embodiment of the container is particularly suitable for storing animal manure and preferably provided with sampling means and homogenizing means.

The invention is further elucidated with reference to the description following hereinbelow of the drawing.

DETAILED DESCRIPTION OF THE INVENTION

Figure 1:
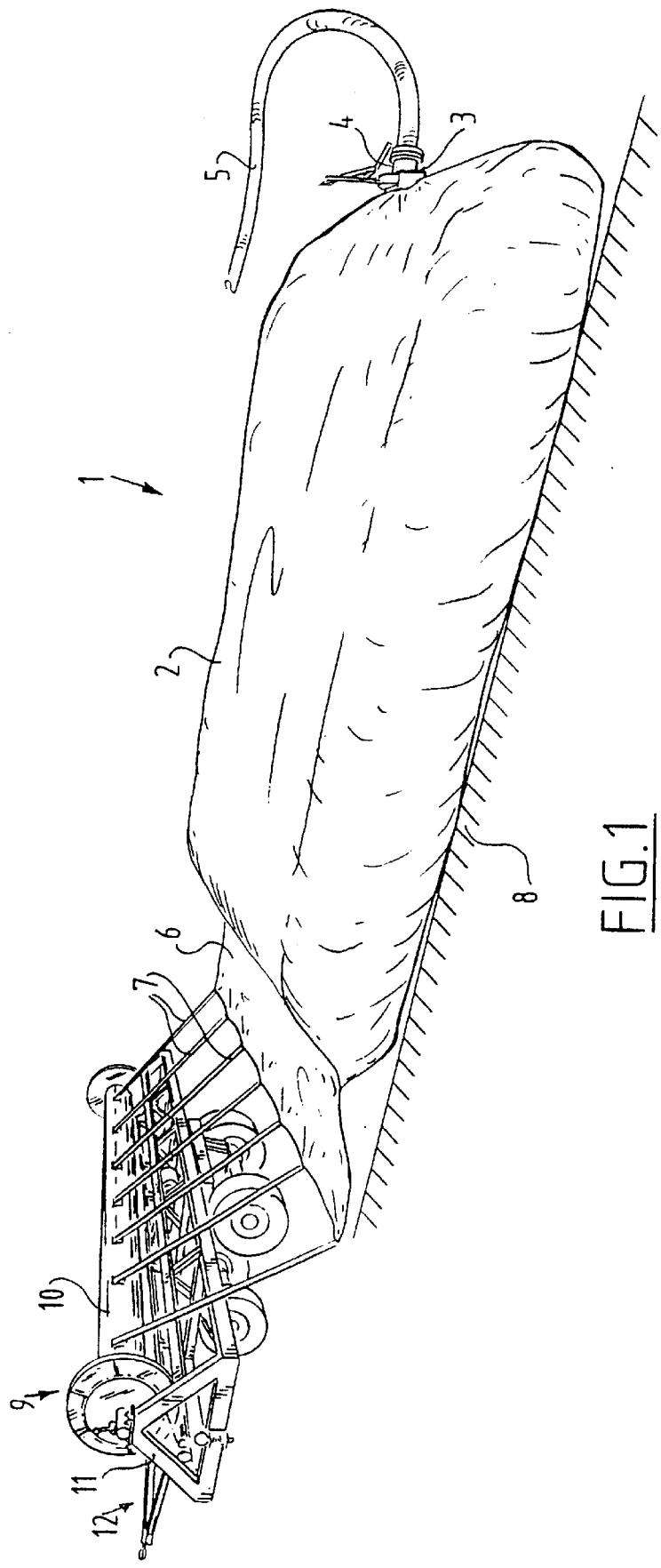
FIGS. 1–2 show perspective views of a preferred embodiment of a transporting device and a container.
Figure 2:
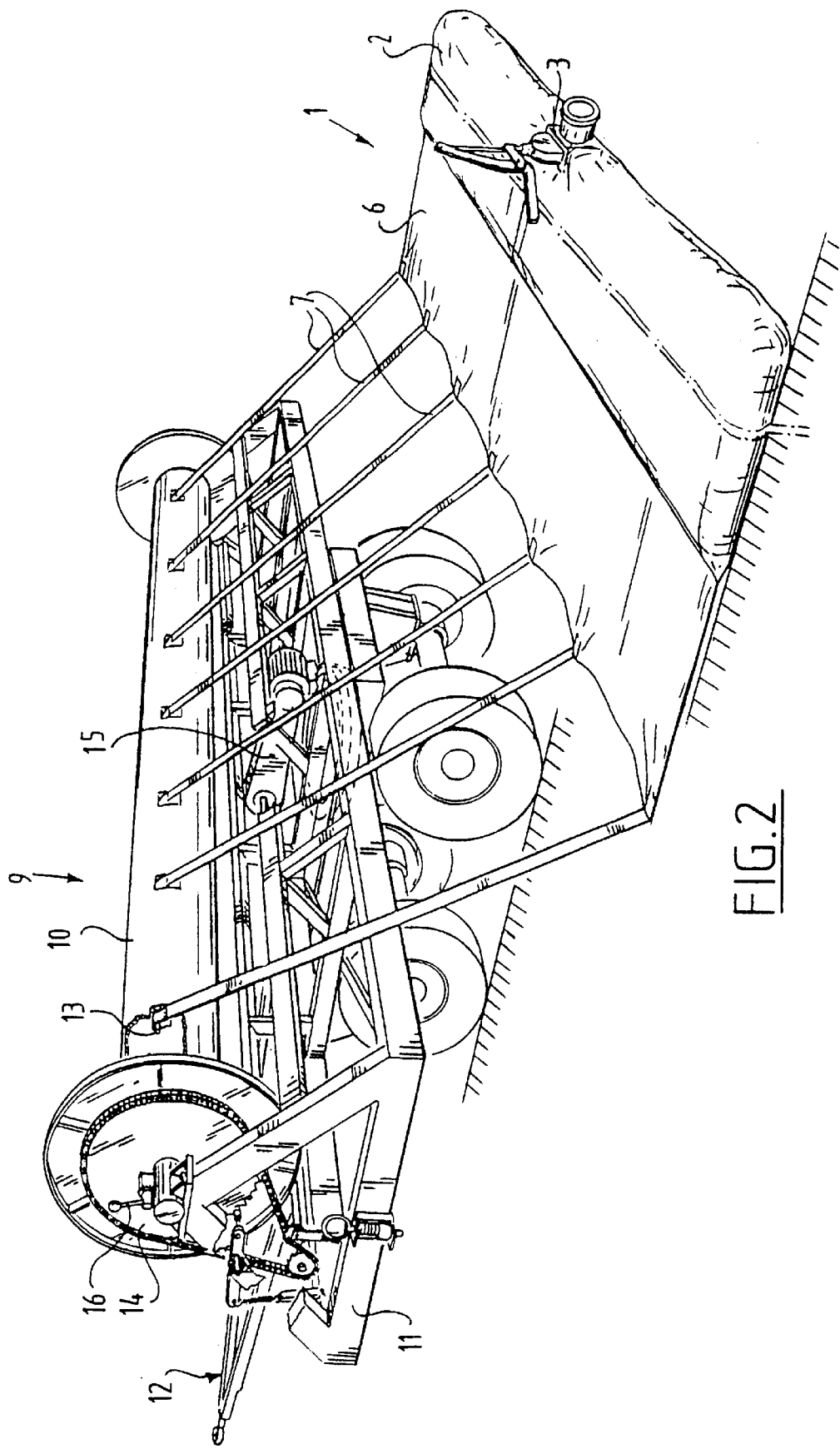
Figure 3:
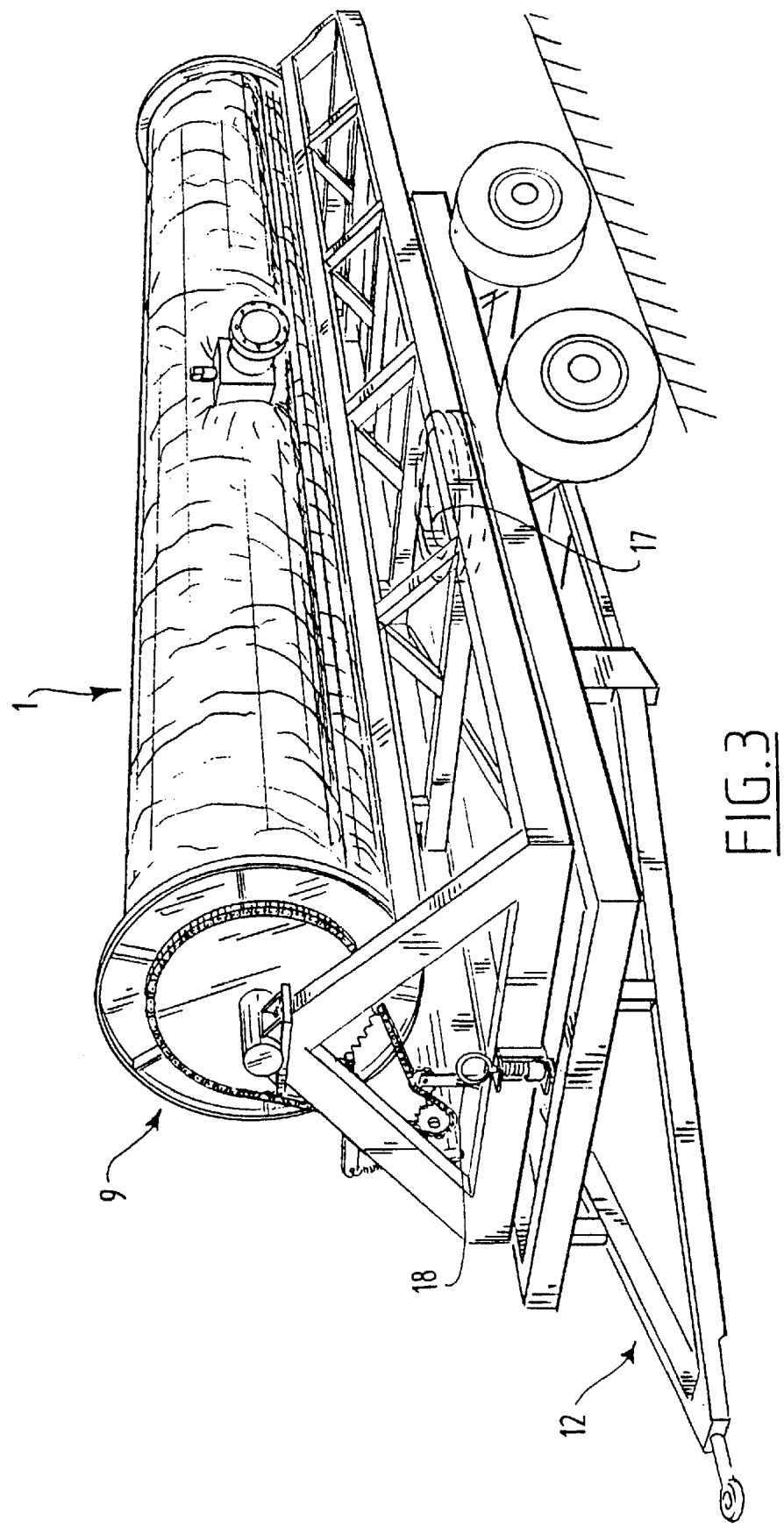
FIG. 3 is a perspective view of a container in a fully rolled-up position, wherein the sub-frame is rotated into the road transport position.

Container 1 is manufactured from a flexible material and consists substantially of a bag 2. This substantially rectangular bag 2 is bounded on its rear side by a strip 6 which is provided with flexible strip-like coupling means 7 and is provided on its front with an inlet and/or outlet opening 1 which is closable by closing means 4 and to which is connected a conduit 5 for feed and/or discharge of material which can be pumped.

The transporting devices 9 comprises a mobile main frame 12 and a sub-frame 11. Mounted in sub-frame 11 is a rolling-up member 10 which is rotatable on a lying shaft and coupled to drive means 18 for the rotations; and which is provided with connecting means 13 for connecting rolling-up member 10 to the coupling means 7 of the rolling-up means 6 of container 1. These connecting means can be formed in simple manner by for instance openings in the rolling-up member into which engage hook-like coupling means 7. Sub-frame 11 is turnable on a standing shaft relative to main frame 12 by means of a turntable 17. Main frame 12 is embodied as a trailer suitable for the public road.

When container 1 is fully rolled onto rolling-up member 16 the sub-frame 11 is turned through 90° on the standing shaft relative to main frame 12, whereafter rolling-up member 10 and sub-frame 11 extend in the same direction as main frame 12. This offers the advantage that the width dimension of a container 1 can be greatly enlarged but without adverse (prohibited) effects for transport on the public road. A locking pin 18 ensures the parallel arrangement of the two frames. A transverse arrangement of rolling-up member 10 and sub-frame 11 relative to the main frame 12 supporting on the ground 6 ensures an easy rolling movement due to the better transmission of forces. During rolling-up the volume remaining in container 1 will likewise be displaced and removed.

The drive means 15 can be operated by a handle 16 with interposing of a gear wheel transmission and chains 14.

The container 1 can be multi-walked and provided with means making it suitable for storage of material which can be pumped, in particular of reactive gaseous material or of manure. Such a container 1 can then serve as temporary store for material which can be pumped and the container can be made suitable for transport in a short time by interposing the transporting device 9. The container 1 can be provided with.

homogenizing means;

sampling means;

pressure control provisions such as de-aerators;

stabilizing provisions, for instance by means of strengthening ribs or cross bands or support frames arranged on the container;

level control means.

What is claimed is:

1. Transporting device (9) for transporting a voluminous container (1), provided with:

a main frame (12), which is mobile and suitable for transporting on a public road;

a sub-frame (11) supported by the main frame (12); and a rolling-up member (10) rotatably mounted on a lying shaft in the sub-frame (11); said rolling-up member (10) having attachment portions attachable to said container;

characterized in that, the rolling-up member (10) has a width exceeding 2.60 meters for a container (1) which is being transported substantially empty, and that the sub-frame (11) is turnable relative to the main frame (12) about a standing shaft.

2. A transporting device (9) as claimed in claim 1, wherein the sub-frame (11) is mounted on a turntable (17).

3. A transporting device (9) for transporting a voluminous container (1), provided with:
   a main frame (12), which is mobile and suitable for transport on a public road;
   a sub-frame (11) supported by the main frame (12); and
   a rolling-up member (10) rotating mounted on a lying shaft in the sub-frame (11); said rolling-up member (10) having attachment portions attachable to said container;
   characterized in that, the rolling-up member (10) has a width of at least 2.60 meters for a container (1) which is being transported substantially empty, and that the sub-frame (11) is turnable relative to the main frame (12) about a standing shaft; and
   characterized in that, the standing shaft is positioned close to the rear end of the main frame (12) and in the middle of the sub-frame (11).

4. A transporting device (9) as claimed in claim 3, wherein the sub-frame (11) is mounted on a turntable (17).

5. The transporting device (9) of claim 3 in combination with:
   a voluminous container (1) to be transported with the transporting device (9), wherein the container (1) has a width of at least 2.60 meters and includes engagement portions configured to engage said attachment portions of the rolling-to member, said engagement portions comprising of least one strip (6), which strip (6) is provided with a plurality of connectors (7) for releasably fastening the container (1) to the attachment portions (13) of the rolling-up member (10) of the transporting device (9).

6. A transporting device (9) as claimed in claim 5, characterized in that, the container (1) is a substantially rectangular bag.

7. A transporting device (9) as claimed in claim 6, characterized in that, the container is provided with safety provisions for at least one of pressure control, stabilization control and level control.

8. A transporting device (9) as claimed in claim 5, characterized in that, the engagement portions (6, 7) are arranged on a first side of the container (1) and that at least one of an inlet opening and an outlet opening (3) is arranged on a second side opposite the first side.

9. A transporting device (9) as claimed in claim 8, characterized in that, the container is provided with safety provisions for at least one of pressure control, stabilization control and level control.

10. A transporting device (9) as claimed in claim 5, characterized in that, the container is provided with safety provisions for at least one of pressure control, stabilization control and level control.

11. The transporting device (9) of claim 3 in combination with:
   a voluminous container (1) to be transported with the transporting device (9), wherein the container (1) has a width of at least 2.60 meters and includes engagement portions configured to engage said attachment portions of the rolling-up member.

12. A transporting device (9) as claimed in claim 11, characterized in that, the container (1) is a substantially rectangular bag.

13. A transporting device (9) as claimed in claim 12, characterized in that, the container is provided with safety provisions for at least one of pressure control, stabilization control and level control.

14. A transporting device (9) as claimed in claim 11, characterized is that, the engagement portions (6, 7) are arranged on a first side of the container (1) and that at least one of an inlet opening and an outlet opening (3) is arranged on a second side opposite the first side.

15. A transporting device (9) as claimed in claim 14, characterized in that, the container is provided with safety provisions for at least one of pressure control, stabilization control and level control.

16. A transporting device (9) as claimed in claim 12, characterized in that, the container is provided with safety provisions for at least one of pressure control, stabilization control and level control.

* * * * *

UNITED STATES PATENT AND TRADEMARK OFFICE
CERTIFICATE OF CORRECTION

PATENT NO. : 6,315,233 B1
DATED : November 13, 2001
INVENTOR(S) : Hubertus Franciscus Cornelius Maria Van Wingerden It is certified that error appears in the above-identified patent and that said Letters Patent is hereby corrected as shown below:

Column 1,
Line 13, "system or" should be -- system for --.

Column 2,
Line 10, "opening 1" should be -- opening 3 --.
Line 14, "devices" should be -- device --.
Line 17, "means 18" should be -- means 15 --.
Lines 26 and 27, "member 16" should be -- member 10 --.
Line 36, "ground 6" should be -- ground 8 --.
Line 42, "multi-walked" should be -- multi-walled --.
Line 49, "with." should be -- with: --.
Line 62, "transporting" should be -- transport --.

Column 3,
Line 13, "rotating;" should be -- rotatably --.
Line 34, "rolling-to" should be -- rolling-up --.
Line 35, "of least" should be -- at least --.

Column 4,
Line 31, "is that" should be -- in that --.
Line 39, "claim 12" should be -- claim 11 --.

Signed and Sealed this

Fifth Day of November, 2002

Attest:

JAMES E. ROGAN
Attesting Officer    Director of the United States Patent and Trademark Office